May 5, 1959 W. MASON ET AL 2,884,952
LINE HYDRAULIC PRESSURE RELIEF VALVE
Filed March 23, 1953 2 Sheets-Sheet 1
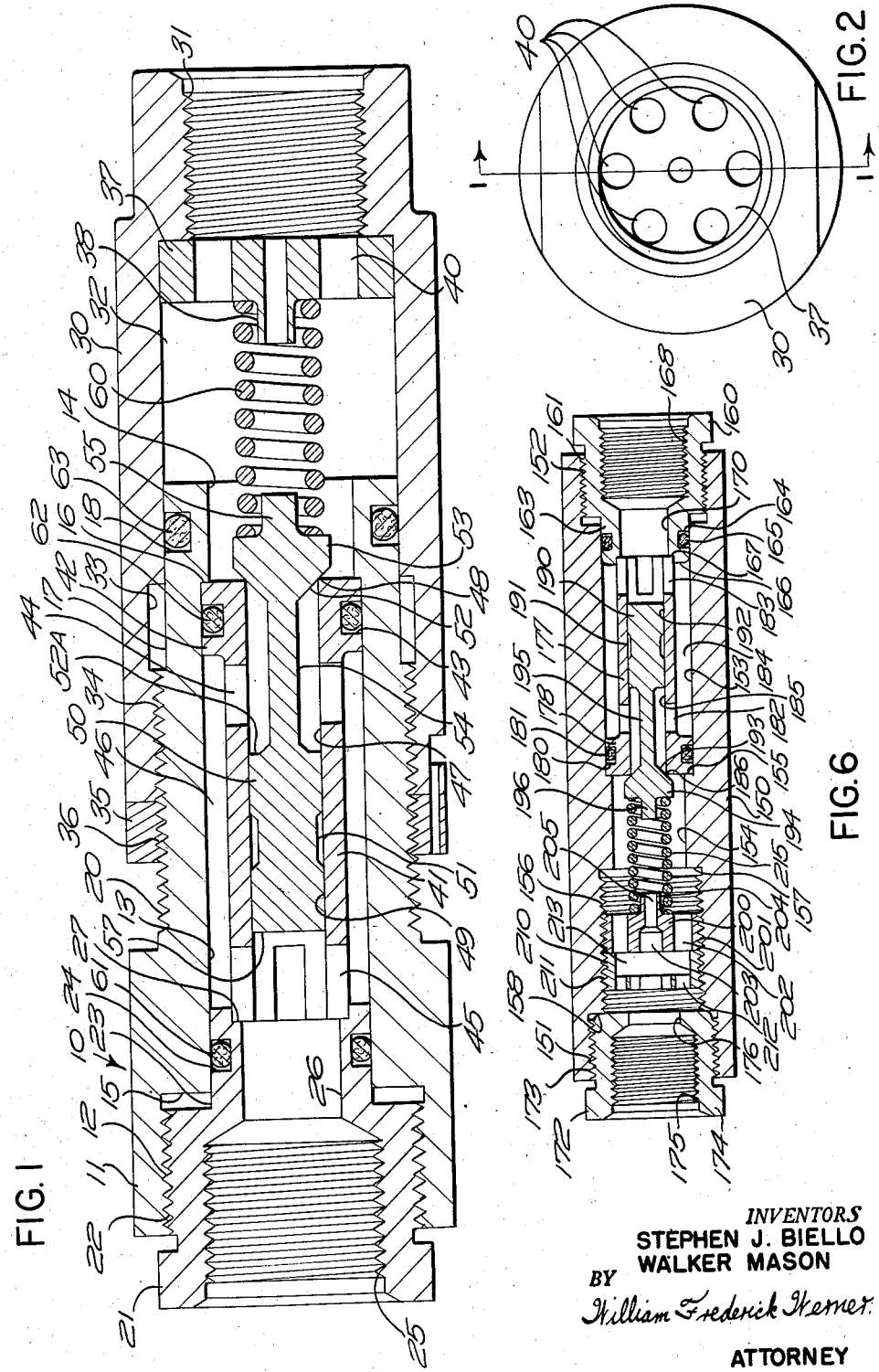
INVENTORS
STEPHEN J. BIELLO
WALKER MASON
BY
William Frederick Werner.
ATTORNEY May 5, 1959  W. MASON ET AL  2,884,952
LINE HYDRAULIC PRESSURE RELIEF VALVE
Filed March 23, 1953  2 Sheets-Sheet 2

INVENTORS
STEPHEN J. BIELLO
WALKER MASON
BY
William Frederick Werner
ATTORNEY

United States Patent Office 2,884,952
Patented May 5, 1959

2,884,952

LINE HYDRAULIC PRESSURE RELIEF VALVE

Walker Mason, Providence, R.I., and Stephen J. Biello, Somerset, Mass., assignors to Avco, Inc., a corporation of Rhode Island Application March 23, 1953, Serial No. 344,072

3 Claims. (Cl. 137—494)

This invention relates to in-line hydraulic pressure relief valves and more particularly to an in-line valve which will control the storing of fluid at a predetermined pressure in an accumulator or the like for operating some work unit.

One of the objects of the present invention is to provide an in-line pressure relief valve for a hydraulic pressure system which satisfies the United States Armed Forces specifications of space, weight, efficiency of operation on pressure control and rate of flow at the outlet over the inlet of the valve.

Another object of the present invention is to provide a pressure relief valve of the in-line type which is particularly adaptable to aircraft because it takes up less space, is lighter in weight and due to efficiency of operation and design is smaller in area for a given rate of flow.

Still another object of the present invention is to provide a hydraulic pressure relief valve in which fluttering of the valve against the valve seat is completely eliminated.

Still another object of the present invention is to provide a hydraulic pressure relief valve which is free flowing, that is, the volume of fluid passing through the outlet side of the valve will be equal to the volume of fluid entering the inlet side of the valve.

And still another object of the present invention is to provide an in-line valve having a single moving part.

A further object of this invention is to provide an in-line hydraulic pressure relief valve which is simple in construction, has means for external adjustment of the pressure controlling element, affording a wide range in pressure capacity and is extremely light in weight and small in size for its rate of flow capacity.

With these and other objects in view, the invention consists of certain novel features of construction which will be more fully described and particularly pointed out in the appended claims.

This application is an improvement over Serial Number 287,481, filed May 13, 1952, now Patent No. 2,676,612, by Robert Stevenson and assigned to the same assignee.

In the past the commercial habit of in-line valve manufacturers has been to manufacture in-line valves in four classes of pressure capacity. The present invention covers the same range of pressure capacities in two classes with a lap over between the classes.

In the past the valves had an internal adjustment which required disconnecting the valve to reach the adjustment. The present invention eliminates the internal adjustment, substituting an outer adjustment while at the same time permitting the adjustment to be made with pressure in the line and without the loss of the hydraulic fluid. Part of the inventive concept of the present in-line hydraulic pressure relief valve is to have the valve hold the pressure in a hydraulic system to within two percent of the required holding pressure. This is accomplished by having the adjustable spring pressure determine the pressure at which the valve plunger will seat or unseat.

Like reference numerals refer to like parts in the accompanying drawings in which:

Figure 1 is a longitudinal sectional view of the new and improved in-line hydraulic pressure relief valve taken along line 1—1 of Figure 2.

Figure 2 is a right hand end view of the same.

Figure 6 is a view similar to Figure 1 but showing a modified form of internal adjustment for the valve spring.

Figure 3:
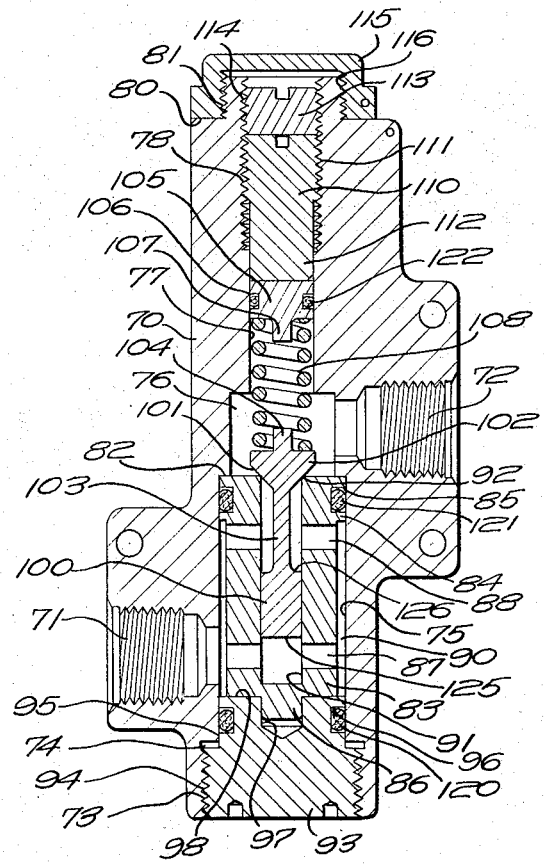
Figure 3 is a longitudinal sectional view of a modified form of valve body incorporating the principles and features of the valve shown in Figure 1. It is a section taken along line 3—3 of Figure 5.

Referring to Figures 1 and 2, wherein is shown the new and improved in-line hydraulic pressure relief valve 10, approximately twice the size of the valve used with one half inch aircraft tubing. The valve body 11 generally cylindrical in shape is fabricated from aluminum or other light weight material and is provided with a central bore 13 throughout its length which comprises a threaded area 12 on one end and an axial passageway 14 on the other end. A wall 15 is formed between central bore 13 and threaded area 12. A flange 16 is formed between central bore 13 and axial passageway 14.

Externally, valve body 11 is provided with a shoulder 17, having a groove 18 and a threaded portion 20.

A gland 21 is provided externally with threads 22 which engage threaded area 12 and a projection 23 having a groove 24.

Internally, gland 21 is provided with threads 25 which form part of a fitting for uniting valve 10 to a hydraulic system and a bore 26 having a recess 27.

A cap 30 generally cylindrical in shape and fabricated from the same material as body 11 is provided axially with threads 31 which form part of a fitting as do threads 25 in meeting military specifications for placing valve 10 in a hydraulic system. Adjacent threads 31 is a chamber 32 which is relieved at 33 as a terminus for threads 34 which engage threads 20. A lock nut 35 is provided with threads 36 which engage threads 20 and lock cap 30 in position on threads 20.

A disk 37 provided with a projection 38 is positioned with a drive fit in one end of chamber 32. Disk 37 is provided with apertures 40.

A liner 41 having a head 42 provided with a recess 43 is positioned in central bore 13 with head 42 abutting flange 16 and its opposite end engaging recess 27. Two series of ports 44 and 45 are provided in liner 41 which forms a chamber 46 with central bore 13. Axially, liner 41 is provided with a sleeve 47 which forms a knife edge valve seat 48 in head 42.

A piston 50 provided with a recess 51 in its sliding piece 49 which engages sleeve 47 has a beveled valve seat 52 formed in head 53 and a stem 54 connecting valve seat 52 with the sliding piece 49. A projection 55 is formed in head 53.

A spring 60 is interposed between head 53 and around projection 55 and disk 37 around projection 38.

Neoprene O-rings 61, 62 and 63 are provided in recesses 24, 43 and 18 respectively to form fluid tight seals at their respective positions.

In operation fluid under pressure will enter bore 26 from the fitting united with threads 25. The fluid will act against end 57 of piston 50 and pass through ports 45 into chamber 46 and then into ports 44 and sleeve 47 around stem 54 where it will be held in check. The pressure in sleeve 47 and around stem 54 will have no effect upon seat 52 because piston 50 is balanced by the pressure on surface 52A.

There will be no fluid in chamber 32 and passageway 14 as long as knife edge valve seat 48 engages beveled valve seat 52. Threads 31 accommodate a conduit leading to a reservoir. Through the adjustment of cap 30 through threads 34 on body 11 and threads 20, the tension of spring 60 can be given a fine adjustment. Therefore, as the fluid acting on end 57 increases, spring 60 can be set at the pressure at which beveled valve seat 52 will leave knife edge valve seat 48, thereby allowing the pressure in one side of the line to be relieved.

Piston 50 will reseat under the influence of spring 60.

It is to be noted that the area of bore 26 is equal to the area of ports 45 which are equal in area to chamber 46 and in turn is equal in area to ports 44. The area of sleeve 47 minus the obstruction of stem 54 when beveled valve seat 52 is seated against knife edge valve seat 48 is substantially equal to the area of ports 44. Therefore the volume of flow through valve 10 is substantially uniform when relief is required because axial passageway 14, chamber 32 and apertures 40 are greater in area than ports 44 or 45. The travel areas of the fluid are never less than the pipe areas.

Figure 4:
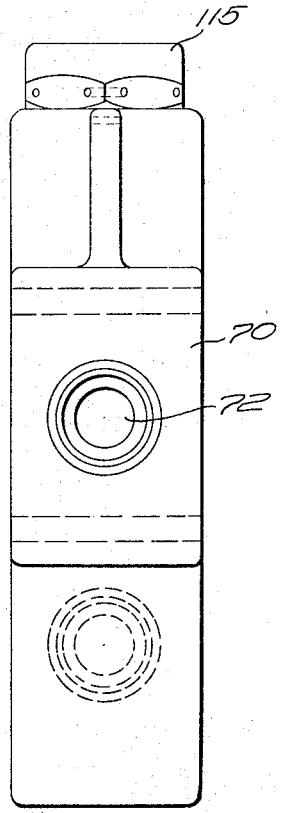
Figure 4 is a side elevational view of the modified form of valve body.
Figure 5:
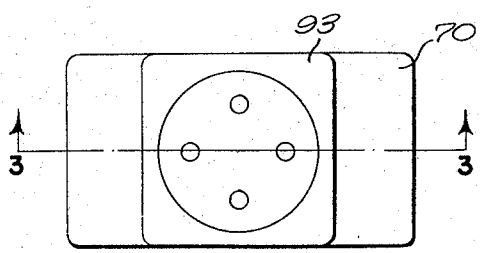
Figure 5 is an end view of Figure 4.

In the modified form shown in Figures 3, 4 and 5, body 70 is provided with an inlet 71 and outlet 72 each of which is provided with the necessary connections to be placed in a hydraulic fluid system. Axially, body 70 is provided with a bore comprising the following sections: threaded, area 73, recess 74, passageway 75 cavity 76, bore 77 and a second threaded area 78. A flange 82 is formed between passageway 75 and cavity 76. Externally, body 70 is provided with a reduced portion creating a shoulder 80 and having threads 81.

A liner 83 having a head 84 provided with a recess 85 is positioned in passageway 75 with head 84 abutting flange 82. Its opposite end is provided with a projection 86. Two series of ports 87, 88 are provided in liner 83 which forms chamber 90 with passageway 75. Axially, liner 83 is provided with a sleeve 91 which forms a valve seat 92 in head 84.

A gland 93 provided with threads 94 engageable with threaded area 73 has a projection 95, provided with a recess 96 engageable with passageway 75. Axially, gland 93 has a counterbore 97 adapted to receive projection 86. Base 98 of gland 93 abuts liner 83 and positions it against flange 82.

A piston having sliding piece 100 engaging sleeve 91 is provided with a valve seat 101 formed in a head 102 and a stem 103 connecting the valve seat with said sliding piece. A projection 104 is formed in head 102.

A plug 105 slidably mounted in bore 77 has a recess 106 in its outside diameter and a projection 107 formed in one end. A spring 108 (or any other resilient means) is mounted between plug 105 and head 102 over projections 104 and 107.

A keeper 110 provided with threads 111 engageable with second threaded area 78 has a stem 112 which fits within bore 77 and abutts plug 105 positioning it in bore 77. A lock nut 113 having threads 114 engageable with second threaded area 78 locks keeper 110 in position. A cap 115 provided with threads 116 which engage threads 81 abuts shoulder 80.

Keeper 110 determining the position of plug 105 in bore 77 also determines the tension of spring 108. Neoprene O-rings 120, 121 and 122 positioned in recesses 96, 85 and 106, respectively, form fluid tight seals at their respective positions. Any other type of fluid tight packing may be used even entailing minor mechanical changes.

In the modified form of internal spring adjustment shown in Figure 6 body 150 may be fabricated from a cylinder having a central bore throughout its length provided with threads 151 and 152 in its opposite ends. A bore 153 is provided adjacent a passageway 154 with a wall 155 formed between them. A threaded area 156 is interposed between passageway 154 and threads 151 with an abutment 157 formed between passageway 154 and threaded area 156 and a flange 158 formed between threads 151 and threaded area 156.

A gland 160 is provided externally with threads 161, which engage threads 152 and a projection 163 having a groove 164. Projection 163 engages bore 153. A fluid tight packing 165 as for example a neoprene O-ring is housed in groove 164 and engages bores 153. The end 166 of gland 160 may be recessed as at 167.

Internally, gland 160 is provided with threads 168 which form part of a fitting for a connection to a hydraulic system and a bore 170.

A cap 172 is provided externally with threads 173 which engage threads 151 and a shoulder 174 which may be hexagonal in shape to accommodate a wrench.

Internally, cap 172 is provided with threads 175 which form part of a fitting for a connection to a hydraulic system and a conduit 176.

A liner 177 having a head 178 provided with a recess 180 is positioned in bore 153 with head 178 abutting wall 155 and recess 167 supporting the end opposite the head. A fluid tight packing 181 such for example as a neoprene O-ring is positioned in recess 167, engaging bore 153.

Two series of ports 182 and 183 are provided in liner 177 which forms a chamber 184 with bore 153. Axially, liner 177 is provided with a sleeve 185 which forms a knife edge valve seat 186 in head 178.

A piston 190 provided with a recess 191 in its sliding piece 192 which engages sleeve 185, has a beveled valve seat 193 formed in head 194 and a stem 195 connecting beveled valve seat 193 with sliding piece 192. A projection 196 is formed in head 178.

An adjusting nut 200 provided with threads 201 which engage threads 156 has a series of orifices 202 provided axially and a socket 203 provided to accommodate a wrench. A stem 204 projects from one side of adjusting nut 200. A perforation 205 in stem 204 communicates with socket 203 to provide an axial passageway through adjusting nut 200.

A lock nut 210 provided with threads 211 which engage threads 156 is provided with a series of apertures 212 and a cavity 213. The central aperture is provided with a size and shape to permit a wrench to be extended through it to socket 203 from conduit 176.

A spring 215 is interposed between head 194 and around projection 196 on one end and adjusting nut 200 and around stem 204 on the other end.

Adjusting nut 200 increases or decreases the tension of spring 215 on head 194. Lock nut 210 locks adjusting nut 200 in adjusted position.

In operation fluid will act on the modified form shown in Figure 6 in the same way as described for the form shown in Figure 1. In effect the difference between the construction of the figures is that the body shown in Figure 6 is made of one piece and disk 37 shown in Figure 1 is replaced with adjusting nut 200 and locking nut 210.

In operation, body 70 will be inserted in a hydraulic fluid line. Pressure will build up. Spring 108 will be set to hold a predetermined pressure. The areas of the piston exposed to fluid pressures are substantially equal so that with equal pressure in the system the plug literally floats. It is the spring 108 alone which determines the pressure at which the piston will leave the knife edge valve seat. The areas through which the fluid passes are substantially equal in area to provide a uniform volume of fluid flow through the valve.

Fluid will flow through inlet 71 into chamber 90 then through ports 87, 88 to act on the base 125 and shoulder 126 of sliding piece 100 and valve seat 101. Fluid in outlet 72, cavity 76 and bore 77 will act on head 102 and projection 104. As the pressure increases in the inlet side of the valve it must build up to overcome the tension of spring 108 to cause valve seat 101 to leave valve seat 92 and relieve the excess pressure.

Having shown and described preferred embodiments of the present invention, by way of example, but realizing that structural changes could be made and other examples given without departing from either the spirit or scope of this invention, what we claim is:

1. A hydraulic pressure relief valve comprising a valve body provided with a central bore throughout its length and with a threaded area in one end and an axial passageway in the other end, a wall formed between the central bore and the threaded area, a flange formed between the central bore and the axial passageway, externally the valve body is provided with a shoulder having a groove and a threaded portion, a gland provided externally with threads engageable with said threaded area, and a projection having a groove, fluid tight packing in said groove engageable with said central bore, internally, said gland is provided with means to be united with a hydraulic line and a bore, a cap provided axially with means to be united with the other side of a hydraulic line constituting an outlet, a chamber adjacent said outlet, and threaded on its opposite end to be adjustably positioned in relation to said valve body through its external threaded portion, means to lock said cap and valve body in adjusted position, a disk provided with apertures fixed in said chamber with said apertures aligned with said outlet, a liner having a head provided with a recess positioned in said central bore and forming a chamber with said central bore, fluid tight packing in said recess engaging said central bore, said head abutting said flange on one side of said liner, the opposite side of said liner abutting said gland, a sleeve axially positioned in said liner with a knife edge valve seat formed in said head, two independent series of ports in said liner providing communication between said chamber and said sleeve, which is in communication with said bore and said axial passageway, a piston provided with a sliding piece slidably mounted between said two independent series of ports, a stem, a head, a beveled valve seat formed in said head, said stem uniting said head with said sliding piece, said beveled valve seat engageable and disengageable with said knife edge valve seat in said sleeve and resilient means interposed between said disk and said head on said piston.

2. A hydraulic pressure relief valve comprising a body having an inlet and an outlet each of which is provided with means to be connected into a hydraulic system, axially, said body is provided with a bore comprising a threaded area adjacent a passageway next to a cavity terminating in a bore area having a second threaded area, a flange is formed between said passageway and said cavity, externally, said body is provided with a reduced portion creating a shoulder and having threads, a liner having a head provided with a recess positioned in said passageway with said head abutting said flange, fluid tight packing in said recess abutting said passageway, a chamber formed between said liner and said passageway, a sleeve in said liner, two independent series of ports in said liner connecting said sleeve with said chamber, a valve seat formed in said head, a gland having threads engageable with said threaded area and a projection provided with a recess, fluid tight packing in said recess engaging said passageway, the end of said projection abutting said liner, a piston having a sliding piece slidably mounted in said sleeve between said two independent series of ports, a head provided with a valve seat connected to said sliding piece by means of a stem, said valve seat engageable and disengageable with said valve seat in said head, a plug slidably mounted in said bore and having a recess, fluid tight packing in said recess engageable with said bore, resilient means interposed between said head and said plug, a keeper provided with threads engageable with said second threaded area and a stem abutting said plug and located in said bore, a lock nut having threads engageable with said second threaded area and abutting said keeper and a cap provided with threads engageable with the threads on said reduced portion and abutting said shoulder.

3. A hydraulic pressure relief valve comprising a body adjustable in length and having a bore, a source of fluid supply to said bore, a liner having a sleeve positioned in said bore and provided with two independent sets of ports, a chamber formed between said liner and said bore, a piston having a sliding piece, slidably mounted in said sleeve between said two independent sets of ports, said two independent series of ports connecting said chamber with said sleeve on opposite sides of said sliding piece, a knife edge valve seat formed in said liner, said piston provided with a head having a beveled valve seat engageable with the knife edge valve seat in said liner, a stem connecting said head on said piston to said sliding piece, a second chamber formed in said body and provided with an outlet, resilient means located in said second chamber for urging said beveled valve seat in said head into engagement with the knife edge valve seat in said liner, said body adjustable in length to vary the tension of said resilient means, the area of said piston being subject to the pressure on the inlet side of said valve, there being no pressure on said piston on the outlet side of the valve except said resilient means, the pressure on said inlet side of said valve must be great enough to overcome said resilient means to cause said beveled valve seat in said head to disengage said knife edge valve seat in said liner to connect said inlet with said outlet through said two independent series of ports and said chamber.

References Cited in the file of this patent

UNITED STATES PATENTS

| 2,287,840 | Stratton | June 30, 1942 |
|---|---|---|
| 2,303,590 | Towler | Dec. 1, 1942 |
| 2,351,512 | Holt | June 13, 1944 |
| 2,555,334 | Green | June 5, 1951 |
| 2,600,875 | Hrdlicka | June 17, 1952 |
| 2,667,893 | Kupiec | Feb. 2, 1954 |
| 2,689,583 | Gardiner | Sept. 21, 1954 |

FOREIGN PATENTS

| 36,407 | Germany | Aug. 14, 1886 |
|---|---|---|
| 139,344 | Great Britain | Mar. 4, 1920 |
| 970,737 | France | June 21, 1950 |